United States Patent [19]

Suzuki

[11] Patent Number: 5,510,893
[45] Date of Patent: Apr. 23, 1996

[54] OPTICAL-TYPE POSITION AND POSTURE DETECTING DEVICE

[75] Inventor: Toru Suzuki, Kanagawa, Japan

[73] Assignee: Digital Stream Corporation, Kanagawa, Japan

[21] Appl. No.: 195,320

[22] Filed: Feb. 14, 1994

[30] Foreign Application Priority Data

Aug. 18, 1993 [JP] Japan .................................. 5-225252
Aug. 26, 1993 [JP] Japan .................................. 5-234019

[51] Int. Cl.$^6$ .............................. G01B 11/26; G01C 1/00; G01C 21/02
[52] U.S. Cl. .................................. 356/139.03; 250/206.2; 250/206.1; 356/141.2; 356/141.5
[58] Field of Search ................................. 250/206.1, 206.2, 250/203.4; 356/139.03, 141.5, 141.1, 141.2

[56] References Cited

U.S. PATENT DOCUMENTS

| | | | |
|---|---|---|---|
| 3,678,283 | 7/1972 | Labaw ................................ | 356/139.03 |
| 3,679,307 | 7/1972 | Zoot et al. | |
| 3,762,820 | 10/1973 | Zoot et al. | |
| 4,111,555 | 9/1978 | Ellis ................................... | 356/139.03 |
| 4,367,403 | 1/1983 | Miller ................................. | 356/141.2 |
| 4,410,270 | 10/1983 | Zuckerman ......................... | 356/141.2 |
| 4,652,917 | 3/1987 | Miller ................................. | 356/139.03 |
| 4,691,446 | 9/1987 | Pitches et al. ..................... | 356/139.03 |
| 4,714,344 | 12/1987 | Hamar ................................ | 356/141.3 |
| 4,923,303 | 5/1990 | Lutz ................................... | 356/141.2 |
| 5,243,179 | 9/1993 | Bjorkman ........................... | 250/206.2 |

*Primary Examiner*—Stephen C. Buczinski
*Attorney, Agent, or Firm*—Ostrager, Chong & Flaherty

[57] ABSTRACT

An optical-type position and posture detecting device includes at least two light sources. The two light sources are disposed at a predetermined distance. The two light sources are alternately switched over. A light receiving element receives light from each of light sources and detects at least two-dimensional angle with regard to each light source. The posture and position of the light receiving element is calculated on the basis of the predetermined distance and two-dimensional angles. An angle detecting device includes a photodetector having at least two receiving portions. At least one light intercepting plate disposed between two light receiving portions, vertically with regard to light receiving portions. The incident angle of light from a light source falling the photodetector is calculated based on the quantities of light received on each of light receiving portions. The light intercepting plate may be made of a light absorbing material or may be made in the form of a two-surface mirror.

7 Claims, 14 Drawing Sheets

TWO-DIMENSIONAL

THREE-DIMENSIONAL

COORDINATE

θ (ANGLE OF LIGHT RECEIVING PORTION WITH RESPECT TO LIGHT SOURCE)

LIGHT RECEIVING PORTION

FOUR-DIVISION PHOTODETECTOR

TWO-DIMENSIONAL PSD

LIGHT VERTICALLY FALLING ON LIGHT RECEIVING SURFACE

LIGHT ANGULARLY FALLING ON LIGHT RECEIVING SURFACE

TWO-DIMENSIONAL PSD

FOUR-DIVISION PHOTODETECTOR

TWO-DIMENSIONAL PSD

TWO COORDINATE SYSTEMS ARE CONSISTENT

LIGHT FROM LIGHT SOURCE 10a $(a+c)-(b+d)=(a'+c')-(b'+d')$

ANGULAR DIFFERENCE EXISTS BETWEEN TWO COORDINATE SYSTEMS

LIGHT FROM LIGHT SOURCE 10b $(a+c)-(b+d)>(a'+c')-(b'+d')$

DIFFERENCE BETWEEN DIFFERENTIAL OUTPUTS IN VERTICAL DIRECTION REGARDING TWO LIGHT SOURCES VS ANGLE OF ROTATION

CALCULATED ANGLE OF ROTATION BEFORE AND AFTER AMENDMENT VS ANGLE OF ROTATION

OPTICAL-TYPE POSITION AND POSTURE DETECTING DEVICE

BACKGROUND OF THE INVENTION

This invention relates to an optical-type position and posture detecting device, and particularly to a device for detecting a three-dimensional position and a posture of a body. The position and posture of the body can be detected, without contact, by mounting the light receiving element on the body to obtain the spatial movement of the body.

Conventionally, as means for detecting the posture of a body, gyroscope has been usually used. However, the gyroscope is very expensive due to precision of its construction. Furthermore, with a system using a light, a plurality of light sources are disposed at a detected section and a plurality of CCD (or charge coupled device) line sensors are disposed as light receiving elements at a light receiving section, and the posture is obtained from the relation between the plurality of light sources and the plurality of light receiving elements.

As for the optical detection of two-dimensional or three-dimensional position coordinates, the coordinate is calculated on the basis of the principle of triangle measurement by positioning a light source on a body and receiving the light from the light source on a plurality of light receiving elements.

Fundamentally, conventional posture detecting means are bulky in construction or complicated. Consequently, they are expensive or not easily movable, and thus not easily be handled. In the meanwhile, the device for detection of position coordinate are simple in construction. However, it cannot simultaneously detect the posture since the light source is disposed at the side of the body in the optical triangle measurement.

This invention also relates to an angle detecting device.

The angle detecting devices are utilized for detecting the position coordinate (two-dimensional coordinate) of the body (or the light source) or for detecting the angle of rotation of the body (the angle of swing of the body) by combining two angle detecting devices. The angle (or position coordinate or angle of rotation) detected by the angle detecting devices is used, for example, as information inputted to an input device for a computer. There have been proposed various types of such angle detecting devices. For example, as an angle detecting device having a movable portion, there is one in which a cylinder with a slit is rotated, and when the slit is directed to the light source is detected by light receiving element positioned within the cylinder and the angle at that time is detected through the position of the slit. There is another one in which the direction of the light source is traced by changing the angle of the light receiving element with respect to the light source so that the quantity of light received from the light source becomes maximum and the angle is continuously detected from the position indicating at the maximum quantity of light. Furthermore, as an angle detecting device not having a movable portion, for example, there is one in which a PSD or a position sensitive device is provided, a lens is disposed in front of the PSD, a light from a light source is focused by the lens, and an angle of the light source is detected through the position where the light spot impinges on the PSD.

The former angle detecting device is complicated in construction and is liable to cause troubles since it has a movable portion. Furthermore, it usually tares much time for detection. Although the latter angle detecting device does not have the above-mentioned problems, the PSD is relatively expensive and the lens is required.

In order to overcome the above-mentioned problems, it has been proposed that a two-division photodetector (two-division photodiode: for one-dimensional angle detection) or a four-division photodetector (four-division PIN photodiode: for two-dimensional angle detection) are used for detection of angle. The two-division photodetector has two light receiving portions disposed adjacent to each other and each light receiving portion independently, electrically detects the quantity of incident light while the four-division photodetector has four light portions, that is, an upper left portion, an upper right portion, a lower left portion and a lower right portion, and each light receiving portion independently, electrically detects the quantity of incident light. In order to detect the angle, an aperture or an opening is disposed in front of the photodetector and the aperture should be set so that the incident light always impinges on each light receiving portion in a range of predetermined angles and simultaneously is not beyond each light receiving portion. The calculation of angle is made on the basis of the difference between quantities of light detected by the light receiving portions or the ratio of the difference between quantities of light to the sum of quantities of light, for example, in case where the difference between quantities of light is normalized. It has been found out that with the two-division or four-division photodetector, the difference between quantities of light or the ratio of the difference between quantities of light to the sum of quantities of light is directly proportional to the incident angle. Therefore, the angle can be calculated from the above-mentioned proportional relation.

As mentioned above, the angle detecting device utilizing the two-division or four-division photodetector is not required to use the lens and is less expensive than that utilizing the PSD. However, since the aperture should be set so that the incident light always impinges on each light receiving portion and simultaneously is not beyond each receiving portion, the diameter of the light spot (in case where the aperture is circular) falling on the light receiving portions should be relatively large in order to gain sufficient quantity of light. Consequently, the photodetector which has a large area of light receiving portions should be used. For example, in case of the two-division photodetector, the photodetector area which is approximately two times aperture area is necessary and in case of the four-division photodetector, the photodetector area which is approximately four times aperture area is necessary. The photodetector which has a large area of light receiving portion is of course expensive.

SUMMARY OF THE INVENTION

It is, therefore, an object of the invention to provide an optical-type position and posture detecting device which is relatively simple in construction and can detect the position and posture of a body.

It is another object of the invention to provide an angle detecting device which can be made to be compact and can use a less expensive photodetector.

In order to accomplish the above-mentioned first object, there is provided an optical-type position and posture detecting device which comprises at least two light sources disposed in predetermined positions at a predetermined distance, means for alternately switching over said light sources, a light receiving element for receiving lights from said light sources and detecting at least two-dimensional angle with regard to each light source to generate signals, and means for calculating the position and the posture based on said predetermined distance and said signals In order to accomplish the second object, there is provided an angle detecting device which comprises a photodetector having at least two receiving portions, at least one light intercepting plate disposed between said two light receiving portions, vertically with regard to said light receiving portions, and means for calculating an incident angle of light from a light source falling on said photodetector based on the quantity of light received on each of light receiving portions. Furthermore, the light intercepting plate may be made of a light absorbing material or may be made in the form of a two-surface mi trot.

BRIEF DESCRIPTION OF THE DRAWINGS

The present invention will be now described in detail with reference to the preferred embodiments illustrated in the accompanying drawings in which.

DESCRIPTION OF THE PREFERRED EMBODIMENTS

The present invention adopts the construction and the positioning of parts, which are easily available and low in price, as a light source and a light receiving unit in order to simultaneously the posture and position of a body (a light receiving unit in the present invention).

Figure 1A:
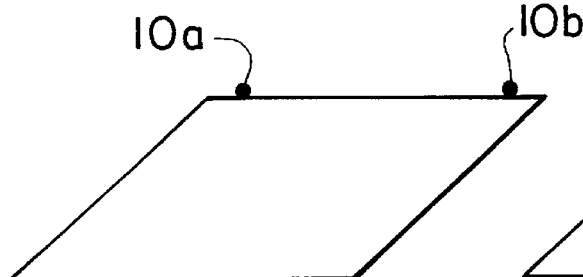
FIG. 1(a)–1(c) is a perspective view for the arrangement of light sources and coordinate system used in the present invention.
Figure 1B:
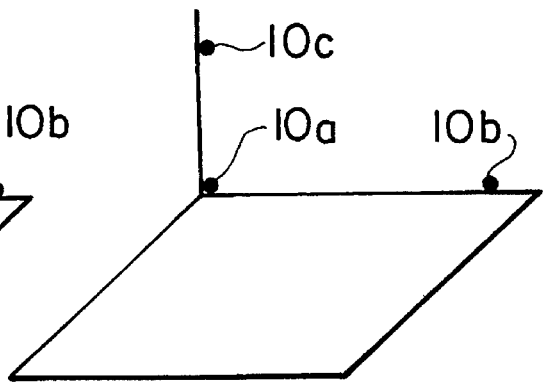
Figure 1C:
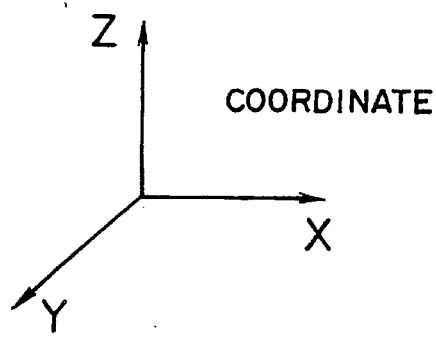

LEDs, light emitting diodes, which have a wide range of radiation angle of light are used as light sources. The two LEDs 10a and 10b are disposed spaced at a suitable distance on a predetermined plane in order to obtain the posture and the two-dimensional position coordinate of a light receiving unit (see FIG. 1 (a)). Furthermore, in order to obtain a three-dimensional position coordinate, another LED 10c is disposed so that it is not on a line where the two LEDs 10a and 10b are disposed (see FIG. 1 (b)). FIG. 1 (c) shows a coordinate system in such a case. On the coordinate system, two LEDs 10a and 10b are disposed spaced from each other on an X axis, and an additional LED 10c is disposed on a Z axis. Furthermore, a body to be detected, not shown, will be in any position in front of an X-Z plane.

Figure 2A:
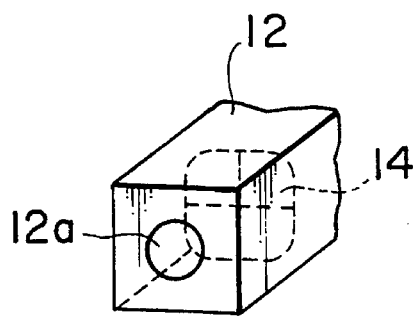
FIG. 2(a)–2(b) is a perspective view showing examples of light receiving elements used in the present invention.
Figure 2B:
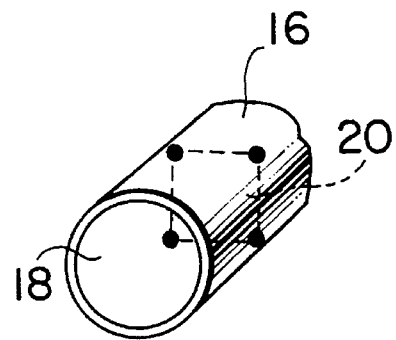
Figure 3A:
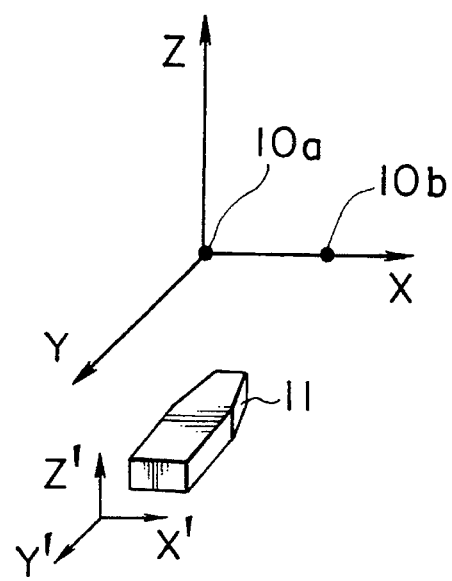
FIG. 3(a)–3(d) is a view for explanation on the posture of the light receiving unit to be detected.
Figure 3B:
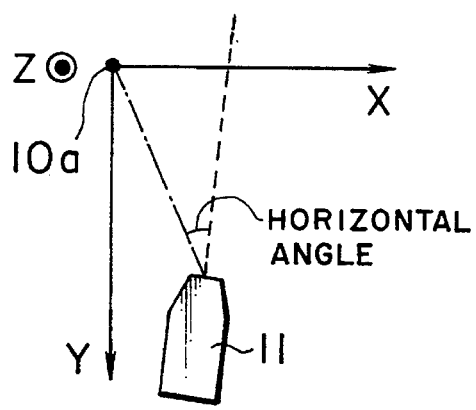
Figure 3C:
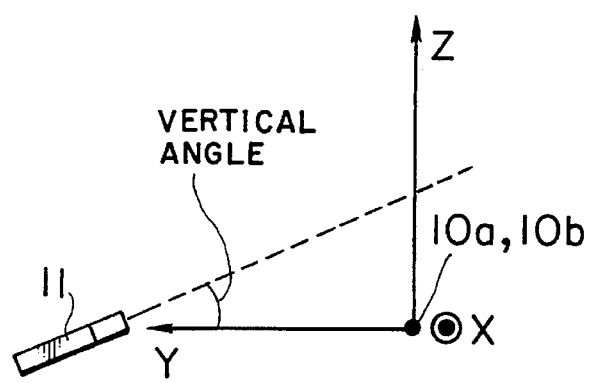
Figure 3D:
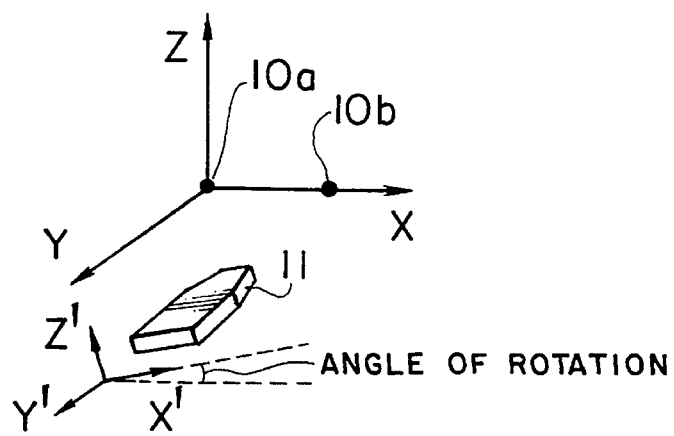

The body to be detected in its posture and position comprises a movable light receiving unit 11 including a light receiving element for receiving the light from the light source (see FIG. 3). As a light receiving element, a four-division photodetector 14 as shown in FIG. 2 (a) or a PSD, position sensitive device, 20 as shown in FIG. 2 (b) is used. The four-division photodetector is a four-division PIN photodiode, for example, which has four divided portions, an upper right portion, an upper left portion, a lower right portion and a lower left portion (see FIG. 4 (b)), and each portion indivisually or independently receives light and detects a quantity of incident light. As shown in FIG. 2 (a), the four-division photodetector 14 is disposed in a casing 12 and circular opening 12a (or a rectangular opening) having an aperture function is formed on the casing 12 in front thereof. As a PSD 20, a two-dimensional position sensitive device is used as described later in detail. As shown in FIG. 2 (b), the PSD 20 is accommodated in a casing 16, and a light focusing lens 18 is provided in front thereof so that it focuses an incident light on the surface of the PSD 20.

Referring now to FIG. 3, an explanation on the posture of the light receiving unit to be detected will be made. Assumed that a light emitting element log is positioned on an original point of XYZ Cartesian coordinates and another light emitting element 10b is positioned on an X axis as shown in FIG. 3 (a). Regarding the posture, (1) a horizontal direction angle of the light receiving unit 11 between a line connecting the original point and the light receiving unit and an orientation of the light receiving unit as shown in FIG. 3 (b), (2) a vertical direction angle on a YZ plane as shown in FIG. 3 (c), and (3) an angle of rotation of the light receiving unit with regard to the X axis including the LEDs log and lob as shown in FIG. 3 (d) can be detected.

An explanation on a calculating procedure of the posture and the two-dimensional position coordinate in case where two light sources are disposed as shown in FIG. 1 now will be made. The two light sources alternately repeats to emit the lights, and the light receiving element receives incident lights synchronous with the timing of emitting lights and outputs information corresponding to incident lights.

Figure 4A:
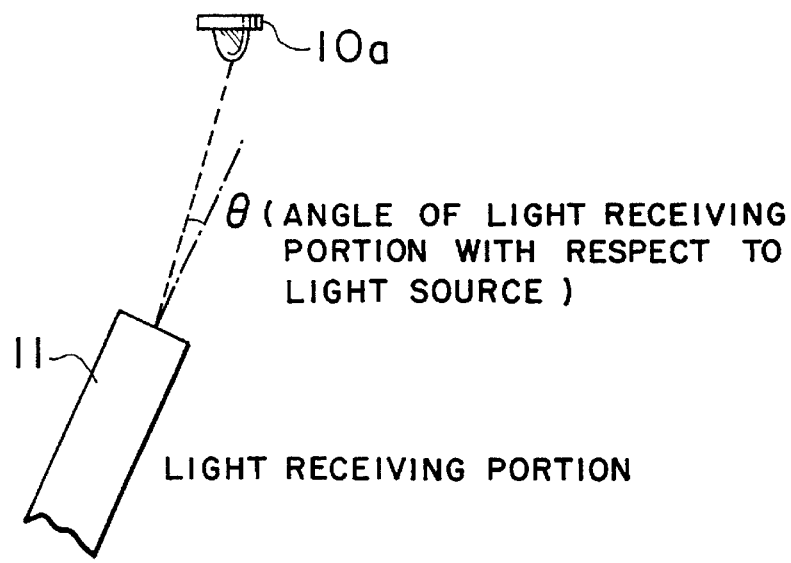
FIG. 4(a)–4(c) is a view for explanation on the quantity of light or incident position of light received on the light receiving element where the light receiving unit is inclined relative to the light source.
Figure 4B:
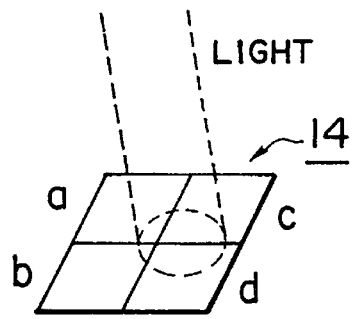
Figure 4C:
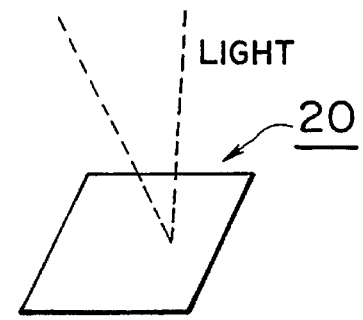

As shown in FIG. 4 (a), when the direction of line connecting the one light source log and the light receiving unit 11 is not consistent to the orientation of the light due to the posture of the light receiving unit 11 with regard to the one light source log, the light from the light source will be angularly or inclinatorily incident on the light receiving element. The manners in which the light fails on the light receiving element are diagrammatically shown in FIG. 4 (b) (in case of the four-division photodetector) and FIG. 4 (c) (in case of the two-dimensional PSD). As shown in FIG. 4 (b), the quantities of the light falling on portions c and d of the four-divided portions of the four-division photodetector are more than those of the portions a and b, and the light spot is offset from the center of the four-division photodetector. Furthermore, as shown in FIG. 4 (c), the light focused on the two-dimensional PSD is also offset from the center thereof.

Figure 5A:
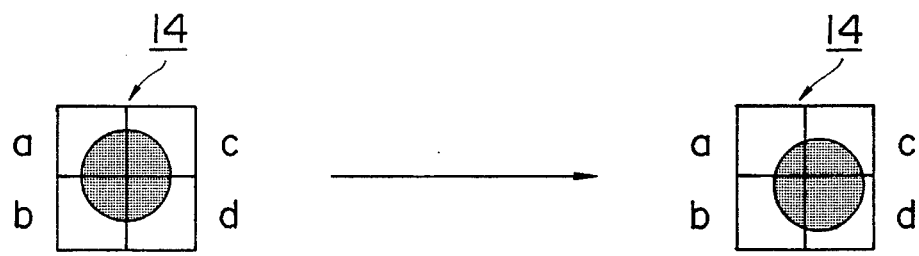
FIG. 5(a)–5(b) is a plan view corresponding to FIG. 4.
Figure 5B:
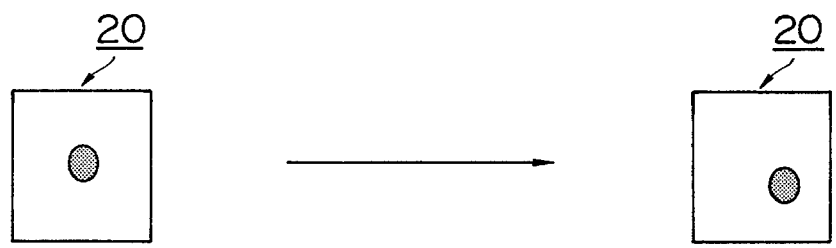

A more detailed explanation will be made with reference to FIG. 5. FIG. 5 shows a distribution of light on the light receiving surface of the light receiving element. The left portion of FIG. 5 (a) (in case of the four-division photodetector) shows the position of light in case where the light receiving element of the light receiving unit is directed to the light source, and at that time, the light falls on the center point of the four-division photodetector and the quantity of light received on each portion a, b, c, and d is equivalent. On the other hand, when the light from the light source angularly falls on the light receiving element as shown in the right portion of FIG. 5 (a), the incident light is offset from the center point and the quantity of light received on each portion a, b, c, and d are different from each other. The left portion of FIG. 5 (b) (in case of two-dimensional PSD) shows the position of focused light in case where the light receiving element of the light receiving unit is directed to the light source, and at that time the light is focused on the center point of the two-dimensional PSD. On the other hand, when the light from the light source angularly falls on the light receiving element as shown in the right portion of FIG. 5 (b), the light is focused on the point offset from the center point.

Figure 6:
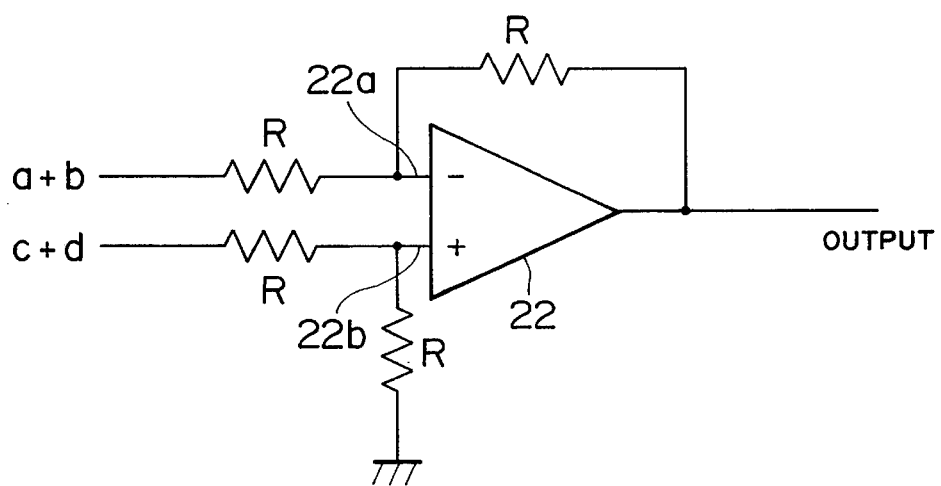
FIG. 6 is a view showing a differential circuit used in the present invention.

As mentioned above, when the light from the light source angularly falls on the four-division photodetector, each divided portion of the four-division photodetector differs in quantity of light from each other. As a result, a difference in output is generated between each portion of the four-division photodetector. FIG. 6 shows a circuit for taking out the difference in output in such a case. For convenience of explanation, quantity of light ( more particularly, voltage value converted from current value depending on the detected quantity of light) on each portion a, b, c, and d of the four-division photodetector is indicated at a, b, c, and d. When the value (a+ b) is inputted to an inversion input terminal 22a of a differential circuit 22 and the value (c+d) is inputted to a noninversion input terminal 22b thereof, the value {(c+ d)−(a+b)} is obtained as an output. An approximate proportional relation exists within a smaller incident angle such as less than 25 degrees between normalized differential output {(c+d)−(a+b)}/ {(c+ d)+(a b)}, which is derived by normalizing the differential output thus obtained, and the incident angle of light, as described below.

Figure 7:
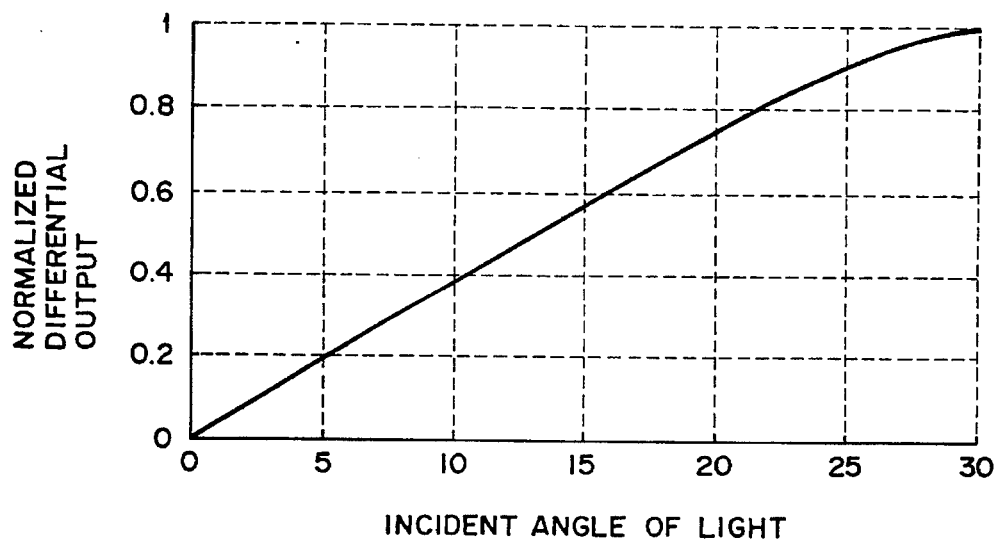
FIG. 7 is a graph showing relation between a normalized differential output and an incident angle of light.

FIG. 7 is a graph showing a relation between a normalized differential output regarding the direction of X or horizontal direction and an incident angle of light. More particularly, FIG. 7 is a graph in case where a distance between the light sources is 300 mm, the diameter of the opening is 3 mm and the distance between the opening and the photodetector is 2.9 mm. Of course, the same result also can be obtained with regard to the direction of Z or the vertical direction. Therefore, the incident angle of light can be conversely obtained from the differential output value by utilizing the graph. As shown in the graph of FIG. 7, the incident angle of light is directly proportional to the differential output approximately within 25 degrees of the incident angle of light. Therefore, assuming that the differential output is D, the angle is θ, and the constant is K, the following equation exists:

$$D = K \times \theta, \text{ and therefore, } \theta = D/k \quad (1)$$

In other words, the angle can be calculated from the equation (1).

Figure 8:
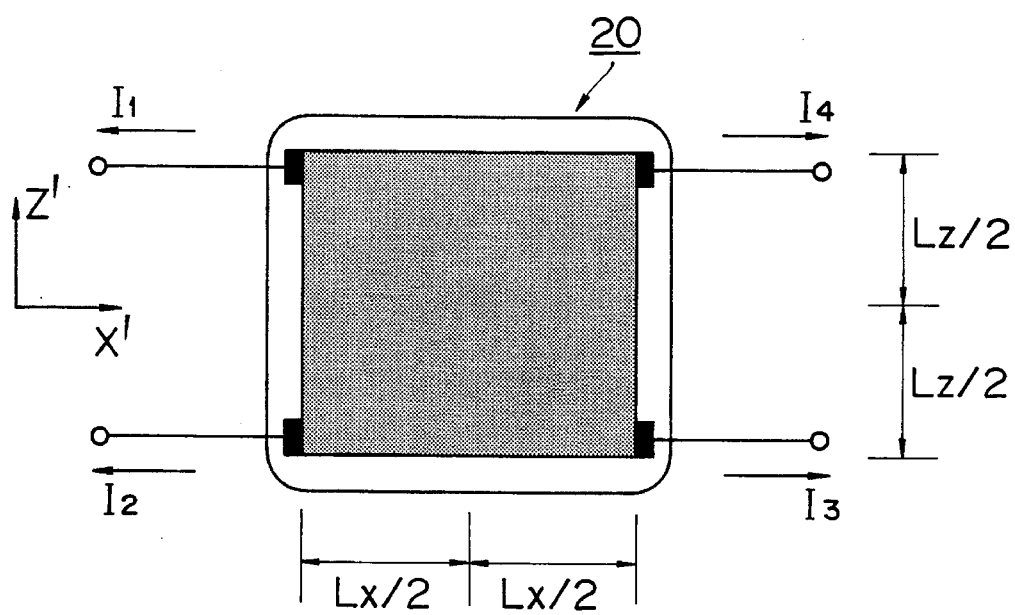
FIG. 8 is a view for explanation on the principle of operation of two-dimensional PSD.
Figure 9A:
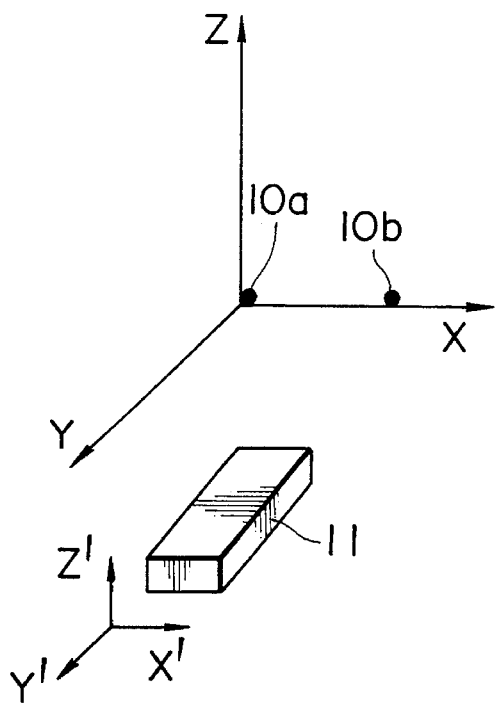
FIG. 9(a)–9(d) is a view for explanation on the states of the incident light received on the light received unit when the light receiving uint is rotated relative to the light source.
Figure 9B:
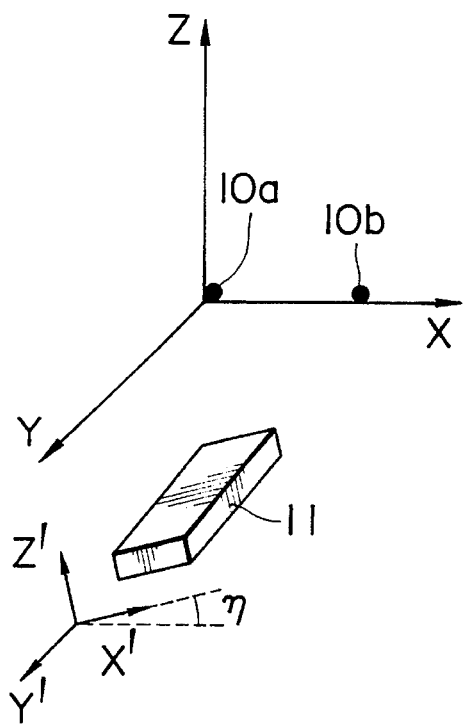
Figure 9C:
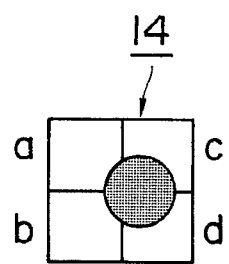
Figure 9C:
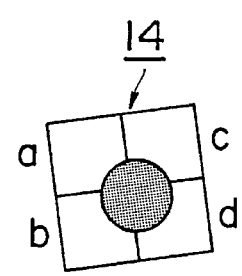
Figure 9D:
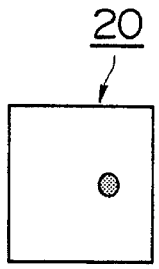
Figure 9D:
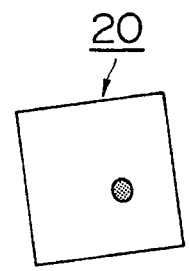

Referring now to FIG. 8, an explanation on two-dimensional PSD will be made. FIG. 8 is a diagrammatical plan view of the two-dimensional PSD. The two-dimensional PSD has output terminals at its four corners. The current values obtained from the output terminals vary in accordance with the position in which the light spot impinges on the surface for detection of the two-dimensional PSD and therefore the position can be obtained from the current values by calculation as described below:

Assuming that the current values obtained at the output terminals are $I_1$, $I_2$, $I_3$, and $I_4$, total current is $I_o$ ($I_1+I_2+I_3+I_4$), the length of the light receiving surface on X axis is Lx, and the length of the light receiving surface on Z axis is Lz, the X coordinate xp of the light spot on the light receiving surface and Z coodinate zp of the light spot on the light receiving surface are obtained from the following equations:

$$xp = (Lx/2) \times (-I_1 - I_2 + I_3 + I_4)/I_0 \quad (2)$$

$$zp = (Lz/2) \times (I_1 - I_2 I_3 + I_4)/I_0 \quad (3)$$

As mentioned above, X coordinate and Z coordinate of the light spot on the light receiving surface can be obtained. Consequently, the distance of movement of light spot on the light receiving surface also can be obtained in the following manner:

Now assumed that the focus distance of the lens is f, the incident angle of light is θ, and the distance of movement of the light spot is s. The θ is expressed in the following equation:

$$\theta = \arctan(s/f) \quad (4)$$

Thus, since the position of the light spot is detected with respect to X axis and Z axis, the incident angle of light can be determined through the above-mentioned equation.

The above-mentioned explanation is directed to how the incident angles of light in the X direction (horizontal direction) and Z direction (vertical direction) can be detected in case where the light receiving unit including one light receiving element is used together with only one light source. In the present invention, two light sources may be used. In such a case, of course, the incident angles of light in the X and Z directions can be detected with respect to each of light sources.

However, the above-mentioned explanation can be applied to the case where the coordinate system on the side of light sources is parallel to the coordinate system on the side of light receiving unit, as shown in FIG. 9 (a). On the other hand, it cannot be applied to the case where the coordinate system on the side of light receiving unit is rotated with regard to the coordinate system on side of light sources, as shown in FIG. 9 (b).

Since the light receiving unit 11 is portable, there is usually a difference in angle between the above-mentioned two coodinate systems, as shown in FIG. 9 (b). Therefore, unless the angular difference, that is, the angle of rotation with respect to the light sources is detected to calibrate the previously obtained incident angle of light, a correct incident angle of light cannot be obtained.

Therefore, an explanation on the procedure of such a calibration will be made. The calibration can be made merely by making conversion of rotation of coordinate system. For example, assumed that there is an angular difference η between two coordinate systems, and the coordinates of light source are xc' and zc' in the X'-Y' coordinate system. The converted values xc and zc are expressed in the following:

$$xc = xc' \cos \eta + yc' \sin \eta \tag{5}$$

$$yc = xc' \sin \eta + yc' \cos \eta \tag{6}$$

When the angle of rotation is viewed in a different way, the incident angle of light on the light receiving element from the light source can be obtained if the angle of rotation is detected. Thus, both direction and angle of rotation of the light receiving unit in the coordinate system on the side of light source are found. Consequently, the posture of the light receiving unit can be detected.

Thus, an explanation on the procedure of detecting angle of rotation will be made. Assumed that a plane including two light sources and light receiving unit is an X-Y plane, a line including two light sources is an X axis, and a Z direction is a vertical direction. With such a coordinate system, FIG. 10 (a) shows the patterns of the received light in case where the light receiving unit is not rotated as shown in FIG. 9 (a). In this case, the incident angles on the light sources 10a and 10b are the same with respect to the vertical direction. In other words, when quantity of light received on each light receiving portion a, b, c, and d of the light source 10a is indicated at a, b, c, and d, and quantity of light received on each light receiving portion a', b', c', and d' is indicated at a', b', c', and d', then (a+c)−(b+d)=(a'+c')−(b' +d').

Figure 10A:
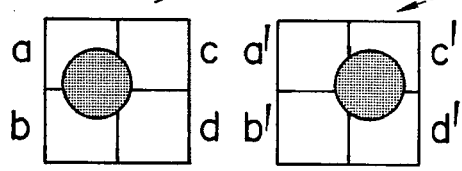
FIG. 10(a)–(b) is a view for further detailed explanation on the states of the incident light received on the light received unit when the light receiving uint is rotated relative to the light source.
Figure 10B:
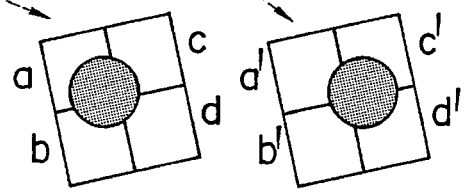

On the other hand, when the difference in angle exists between the coordinate systems as shown in FIG. 9 (b), the patterns become as indicated in FIG. 10 (b). In this case, the difference is generated between the incident angles on the light sources 10a and 10b. Thus, (a+ c)−(b+d)>(a'+c')−(b'+ d').

Figure 11:
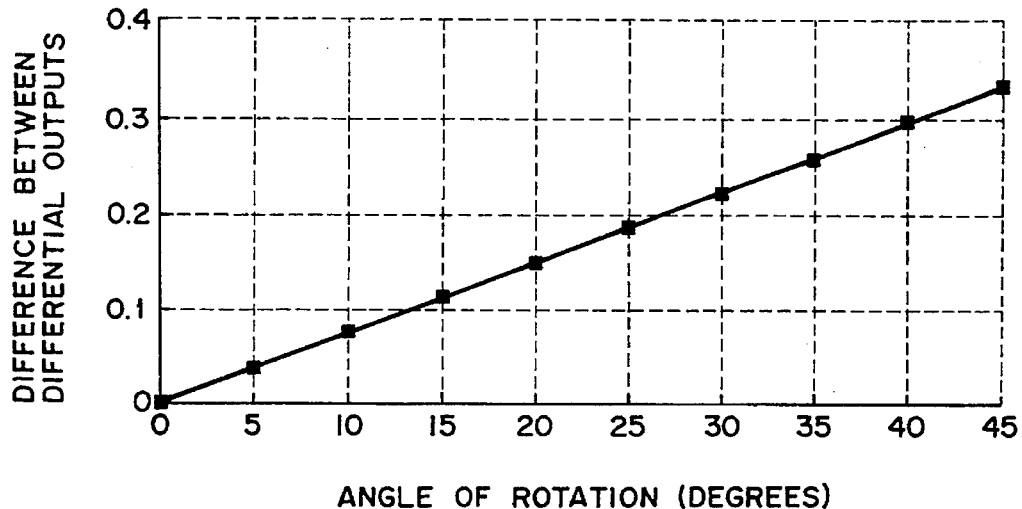
FIG. 11 is a graph for explanation on a relation between a difference between differential outputs and an angle of rotation.
Figure 14:
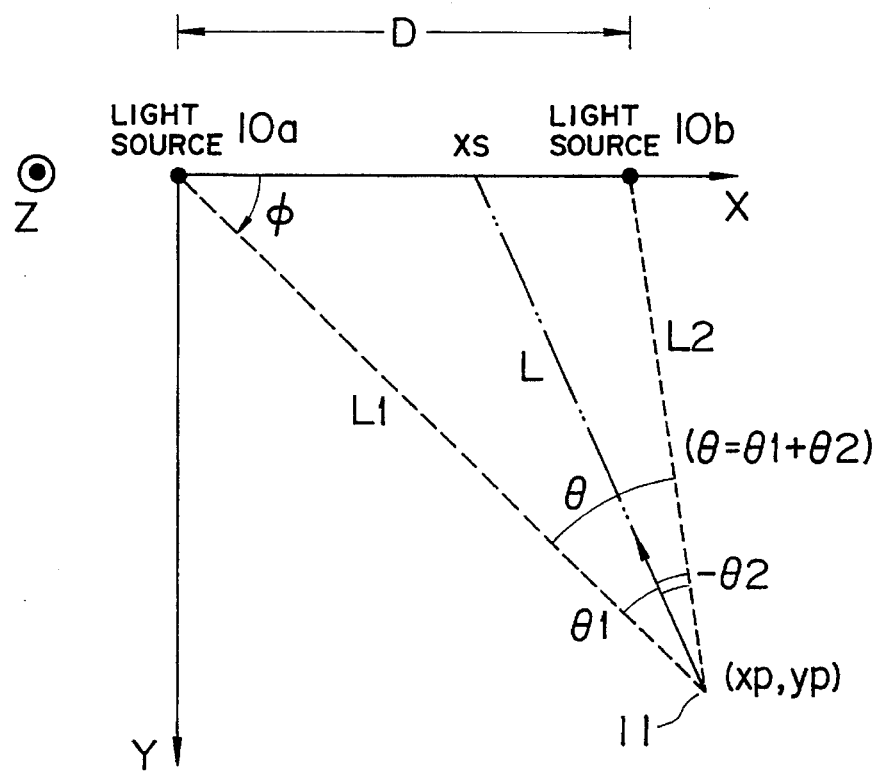
FIG. 14 is a view for explanation on calculation of a position coordinate.

However, an appropriate directly proportional relation between the angle of rotation and the angular difference exists as shown in FIG. 11 and thus the angle of rotation can be obtained from the difference between the differential outputs of the light receiving elements. Furthermore, since the proportional constant at that time is reverse proportional to the distance between the light source and the light receiving element, the finding of the distance is required. Although the distance can be obtained from calculation of the coordinate position of the light receiving unit, it also can be obtained in a different way, which will be explained with reference to FIG. 14.

Assumed that the difference between the light sources 10a and 10b is D, an angle of the light receiving unit with respect to the light source 10a in a horizontal direction is θ1, an angle of the light receiving unit with respect to the light source 10b in a horizontal direction is −θ2, and the peak angle of a triangle which is formed by the two light sources and the light receiving unit is θ. Then, θ=θ1+θ2.

Assumed that the distance from the light receiving unit to the line connecting two light sources or the X axis is L. Then, the L is expressed in the following when the difference between the distance L1 from the light source 10a to the light receiving unit 11 and the distance L2 from the light source 10b to the light receiving unit 11 is small:

$$L \approx (D/2)/\tan(\theta/2) \tag{7}$$

Assumed that the angle of rotation is η, the proportional constant is Ka, the angle in a vertical direction of the light source 10a is v1 and the angle in a vertical direction of the light source 10b is v2. Then, the following equation exists:

$$\eta = Ka \times (v1 - V2)/L \tag{8}$$

Figure 12:
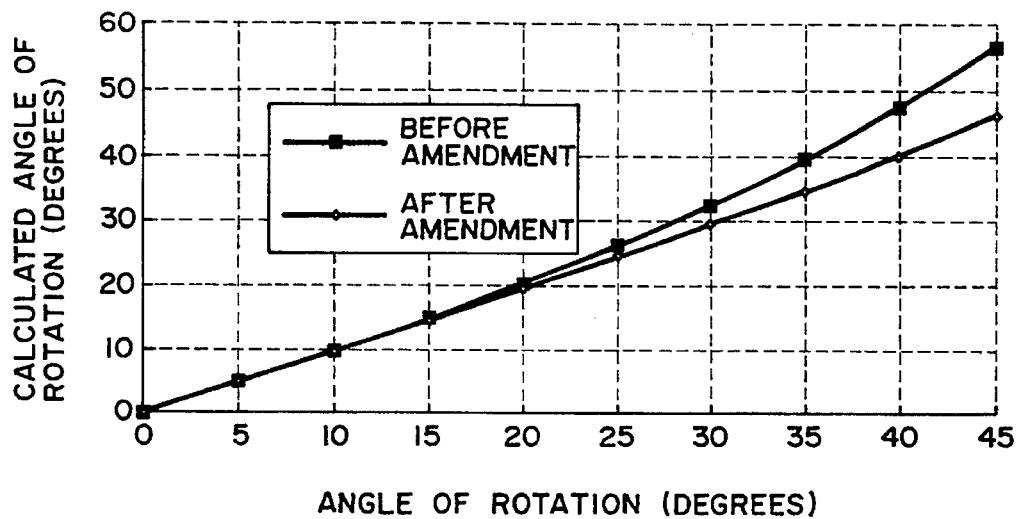
FIG. 12 is a view for explanation on relation between calculated angles of rotation before calibration and after calibration and an angle of rotation.
Figure 13:
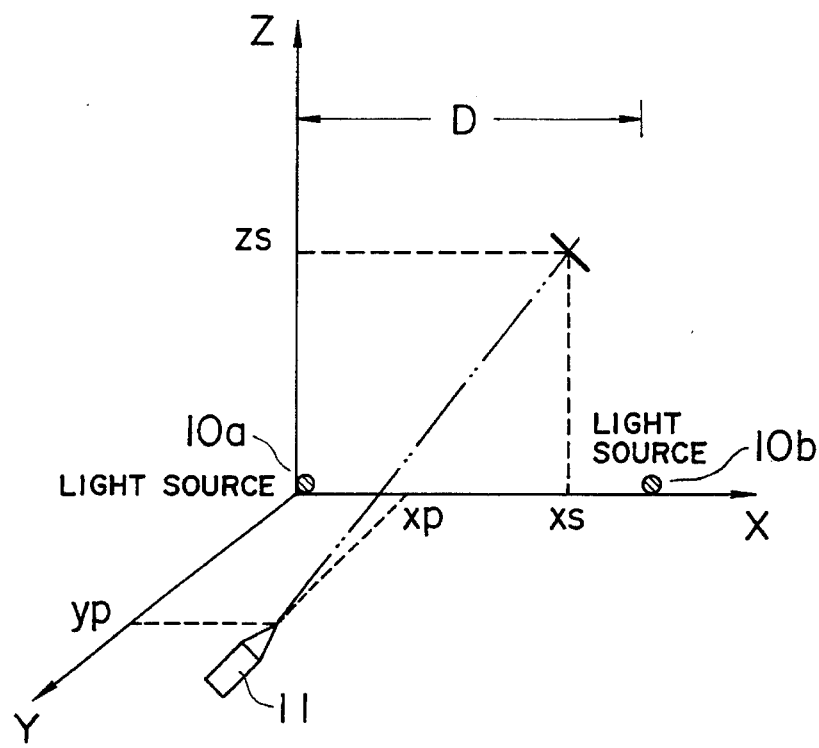
FIG. 13 is a view for explanation on calculation of a position coordinate.

It is clear from the aforegoing that the posture of the light receiving unit now can be detected. However, when the angle of rotation is beyond 30 degrees, effects due to inclination of the light receiving unit appears not only in a vertical direction, but also in a horizontal direction. Consequently, the angle θ1 and θ 2 would be calculated as offset from the actual horizontal angles. The error included in the calculation of the L becomes large due to the effects and the error on the calculated angle of rotation increases. In order to compensate for this, the angle of rotation is calculated from the first data and then the amendment on data is carried out using the calculated angle of rotation and the equations (5) and (6) to recalculate the incident angles of light in a horizontal direction. After recalculation, the incident angle of rotation are again calculated based on the recalculated values of θ 1 and θ2. FIG. 12 shows a graph for comparing the calculated angle of rotation with actual angle of rotation when the above-mentioned procedure is taken and is not taken.

Next, the calculation method of detecting the coordinate of the light receiving unit will be explained. At the X-Y plane in the FIG. 14, the distance between the light sources 10a and 10b is known, and the θ is calculated in accordance with the previous equation. The strength of light can be detected and is expressed in the term of (a+b+ c+ d ) in case where the light receiving element is the four-division photodetector or in the term of the sum of electric current values $I_0$ in case where the light receiving element is the PSD. The quantities of light which are received on the light receiving element of the light receiving unit can be measured, and assuming that the strengthes of light from light sources 10a and 10b are P1 and P2, respectively, the following equations exist:

$$L1 = D \times (\cos\phi + \sin\phi/\tan\theta) \tag{9}$$

$$L2 = D \times \sin \phi/\sin\theta \tag{10}$$

Furthermore, from the relation between the strength of light and the distance, the following equation exists:

$$L1/L2 = (P2/P1)^{1/2}$$

Therefore, $$\begin{aligned}(P2/P1)^{1/2} &= \sin\theta(\cos\phi + \sin\phi/\tan\theta) \div \sin\phi \\ &= \cos\theta + \sin\theta/\tan\phi\end{aligned}$$

Therefore, $$\phi = \arctan\{\sin\theta/(P2/P1)^{1/2} - \cos\theta\}$$

When the value of φ is put in the equation (9), the L1 is found out.

Then, $$xp\ L1 \times \cos \phi \quad (11)$$

$$yp = L2 \times \sin \phi \quad (12)$$

That is, the coordinate position of the light receiving unit can be obtained.

As the coordinate is obtained, the position (xs, zs) in which the extension line of the leading end of the light receiving unit crosses X-Z plane is specified by the following equation (see FIG. 14):

$$xs \times \cos \phi + xs \times \sin \phi / \tan \theta_1 = L1$$

Therefore, $$xs = L1/(\cos\phi + \sin\phi/\tan\theta_1) \quad (13)$$

Furthermore, since, as explained in the calculation of the incident angle, the angle in the vertical direction can be measured similar to the angle in the horizontal direction, the Z coordinate zs of the crossing position can be in the following equation, for example, assuming that the angle in the vertical direction with respect to the light source 10a is θ v:

$$zs = L1 \times \tan(\theta v) \quad (14)$$

Thus, from the equations (10), (11), (12) and (13), XY plane position of the light receiving unit and the crossing position, in which the extension crosses XZ plane, as an additional information are calculated, respectively.

To summarize, the procedure of the calculation of the two-dimensional coordinate of the light receiving unit is in the following:

Firstly, the incident directions of light with respect to the vertical and horizontal directions are obtained from the differential outputs of the light receiving element in case of the four-division photodetector or spot falling position in case of the PSD through the conversion graph or calculation. Then, the angle of rotation of the light receiving unit is obtained from the difference between angles in vertical direction with respect to two light sources and the distance between the light sources and the light receiving unit, or the like. By conversion of the coordinates using the angle of rotation, the angles of the light receiving unit in the horizontal and vertical directions with respect to the light sources are amended. Finally, the two-dimensional coordinate of the light receiving unit is calculated on the basis of the angles thus obtained and the ratio of the strengthes of the light which reaches the light receiving portions of the light receiving unit.

When another light is disposed on the Z axis, another angle information is obtained in a similar manner, as mentioned above. Using that angle information, the coordinate of the light receiving unit on Z axis can be calculated, and consequently the three-dimensional position of the light receiving unit can be obtained. This is derived by calculation with respect to the YZ plane similarly to the calculation with respect to the XY plane.

Thus, the posture and two or three-dimensional position coordinates of the light receiving unit can be calculated.

Figure 15:
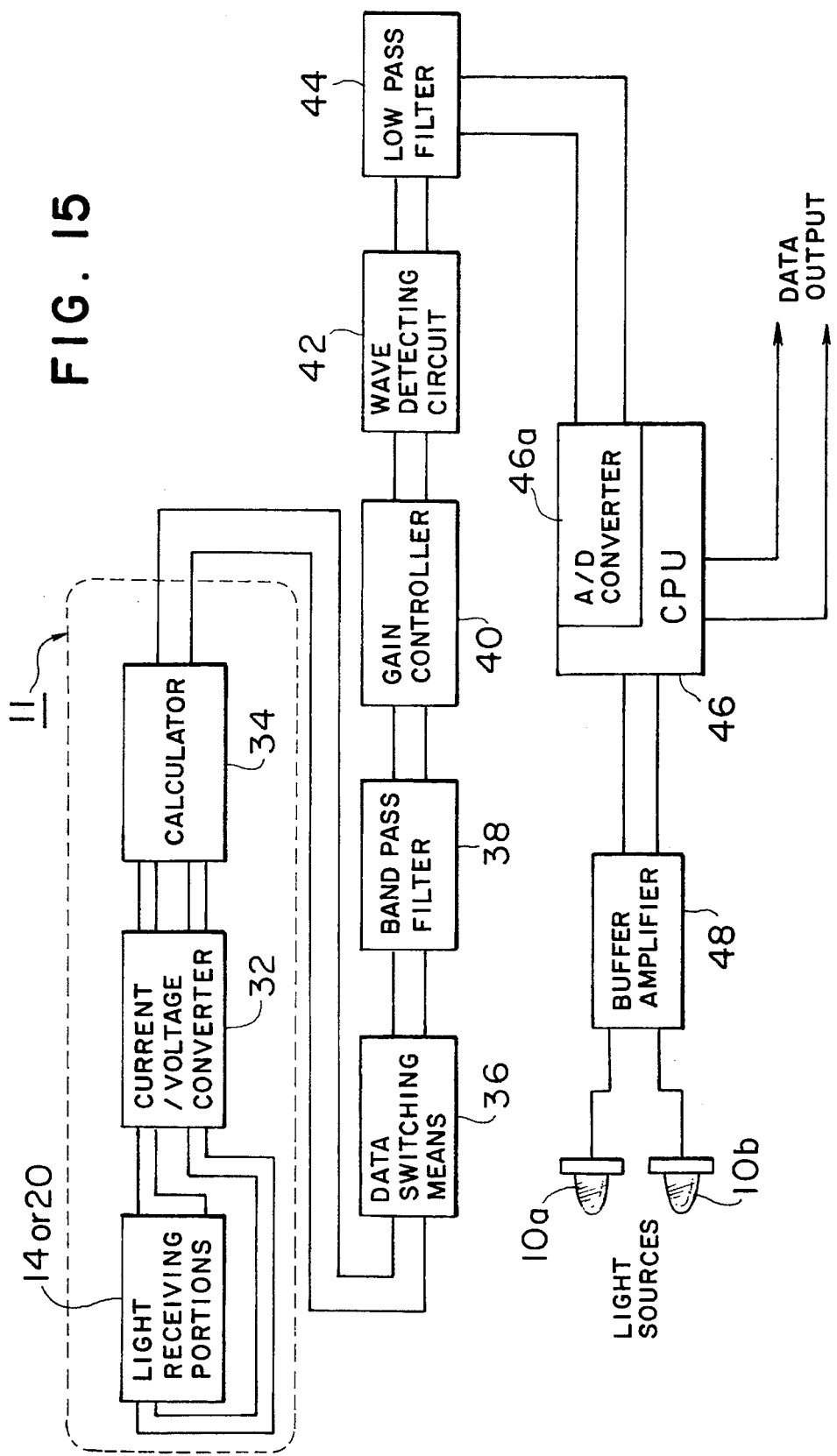
FIG. 15 is a block circuit of an optical-type position and posture detecting device.

Finally, the operation of the circuit in accordance with the present invention will be briefly explained with reference to FIG. 15. In FIG. 15, the light receiving unit 11 comprises a four-division photodetector 14 or a PSD 20 as a light receiving element. The light receiving unit 11 further includes current/voltage converter 32 which convert the current obtained in accordance with the quantity of the light to the voltage. The light receiving unit 11 further comprises a calculator 34 which makes the calculation of the difference or the sum on the basis of the voltages obtained from the current/voltage converter 32 as required for calculation of the position or posture. The data thus obtained is transferred to the device body. In the device body, the data is switched over by a data switching means 36 in accordance with the switching of the light sources 10a and 10b. Each of data is passed through a band pass filter 38 to eliminate noises, transferred through a gain controller 40, a wave detecting circuit 42, a low pass filter 44, an A/D converter 46a to a CPU 46. At the CPU, the switching over of the light sources 10a and 10b, and the signal for switching over is given to the light sources 10a and 10b through a buffer amplifier 48.

As mentioned above, in accordance with the present invention, the posture and the position of the body (the light receiving unit) can be simultaneously detected even with a simple construction, and therefore the cost can be suppressed, comparing with the conventional system for obtaining similar information. Therefore, the present invention is considered to be applied to novel usages. For example, it can be applied to sensors for detecting the movement of hands or a head for realizing the virtual reality or a controller for controlling the operation of TV games.

Figure 16:
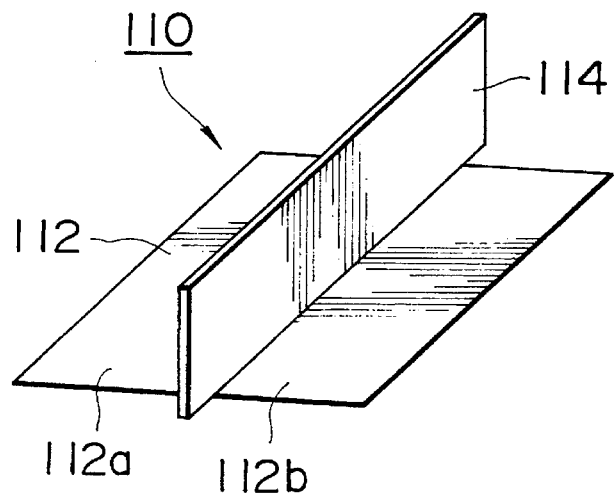
FIG. 16 is a perspective view showing an angle detecting device in accordance with the present invention using two-division photodetector.

Now, an explanation on an angle detecting device will be made with reference to FIGS. 16 through 20. In FIG. 16, an angle detecting device 110 comprises a two-division photodetector 112 having two light receiving portions 112a and 112b, and a light intercepting or interrupting plate 114 which has a suitable height and is vertically disposed between the two light receiving portions 112a and 112b. The light intercepting plate is, in this embodiment, made of a light absorbing material which almost does not reflect the light.

Figure 17A:
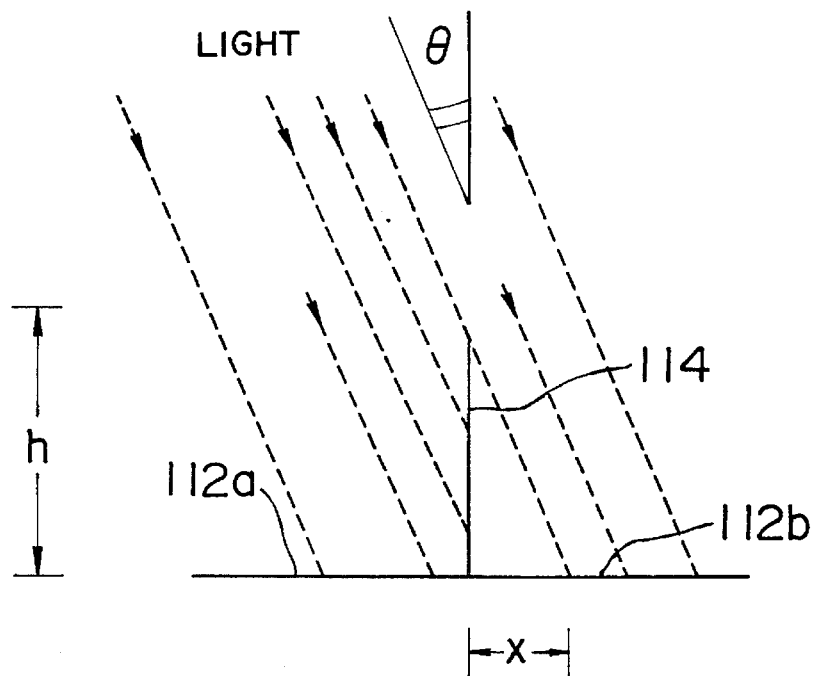
FIGS. 17(a)–17(b) are a side view and a plan view of FIG. 16.
Figure 17B:
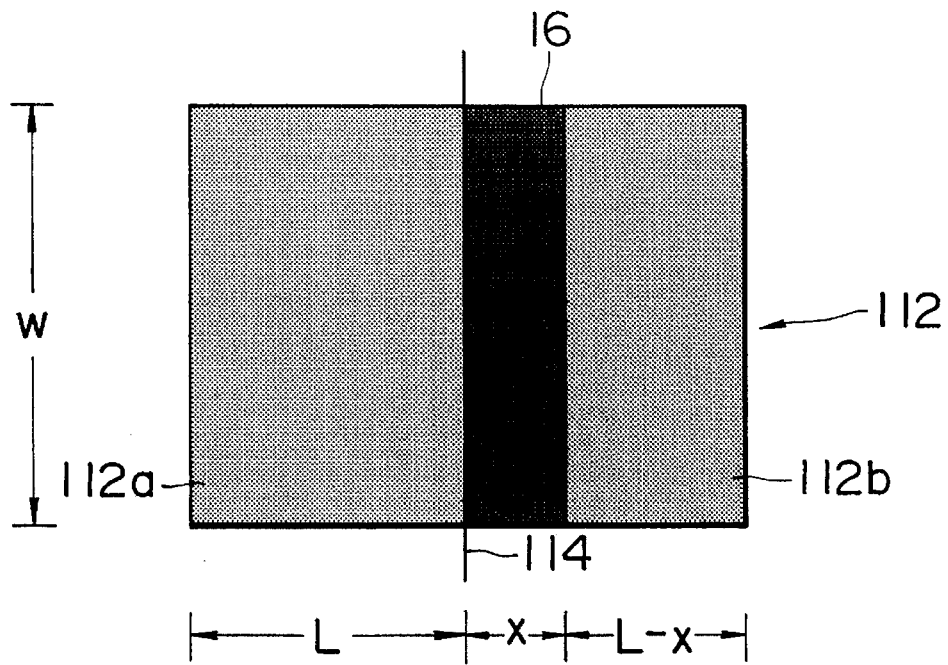

Referring to FIGS. 17 (a) and 17 (b), an explanation on calculation of angle will be made. Assumed that the length of each of light receiving portions 112a and 112b of the two-divisional photodetector is L, its width is W, the height of the light intercepting plate is h, the difference between quantities of light received on the light receiving portions is D, and the angle of light incident on the light receiving portions with regard to the light intercepting plate 114 is θ in such a case, the length (x) of shadow or shading portion generated in the lengthwise direction of the light receiving portion due to the interception by the light intercepting plate 114 is expressed in the following:

$$x = h \cdot \tan \theta \quad (15)$$

Further, the difference (D) in quantity of light is expressed in the following:

$$D = \{ LW - (L-x)W \} = x \cdot W \quad (16)$$

When the distance between the light source and the photodetector or the light output of the light source varies, the quantity of light falling on the photodetector varies even when the incident angle of light is constant. This is because the quantity of light which reaches the photodetector varies. Thus, normalization is required. Furthermore, when more than two photodetectors are used, normalization with respect to the difference in quantity of light between photodetectors is also required in order to calibrate or amend the difference in sensitivity between the photodetectors. It is also desirable that normalization should be made to eliminate the difference in sensitivity between the products even in case where only one photodetector is used. As methods of normalization, there are two possible ways, for example, (1) one in which the ratio of the difference in quantity of light between two light receiving portions to the quantity of light falling on light receiving portion having a shadow on which all the light fall on, and (2) the other in which the ratio of the difference in quantity of light between two light receiving portions to the sum of quantities of light received on two light receiving portions.

Assumed that the normalized difference in quantity of light in case of the above-mentioned (1) is indicated at $D_{N1}$ and the normalized difference in case of (2) is indicated at $D_{N2}$. The $D_{N1}$ and $D_{N2}$ are expressed in the following:

$$D_{N1} = xW/LW = h \cdot \tan \theta / L \tag{17}$$

Therefore, $$\theta = \tan^{-1}(L \cdot D_{N1}/h) \tag{18}$$

$$D_{N2} = xW/\{LW + (L-xW)\} \tag{18}$$

$$= h \cdot \tan \theta / (2L - h \cdot \tan \theta) \tag{19}$$

From the equation (19), $(1+D_{N2})h \cdot \tan \theta = 2L \cdot D_{N2}$
Therefore, $\tan \theta = 2L \cdot D_{N2}/(1+D_{N2})h$
Therefore, $$\theta = \tan^{-1}\{2L \cdot D_{N2}/(1+D_{N2})h\} \tag{20}$$

Figure 18:
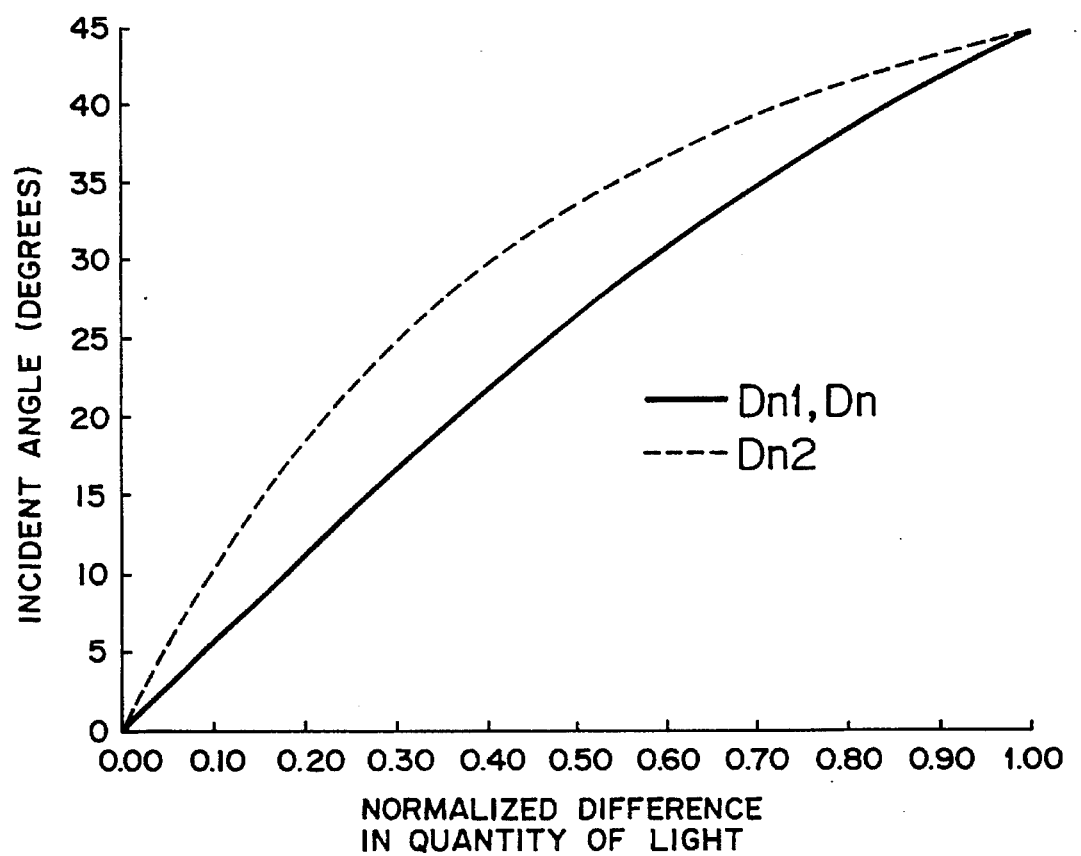
FIG. 18 is a graph showing relation between two normalized differences in quantity of light and an incident angle of light received on the light receiving portions of the photodetector.

Referring now to FIG. 18, FIG. 18 shows relation between the above-mentioned two normalized differences in quantity of light and the incident angle in case where L=h. As clear from FIG. 18, the first normalization has more directly proportional relation between the normalized difference in quantity of light and the incident angle than that of the second normalization. Consequently, it is preferable that the first normalization in which approximate values can be obtained in a simple equation of proportional relation is used. However, if the calibration is made, either normalization may be adopted. Furthermore, an incident angle may be obtained in the following manner: Each incident angle corresponding to normalized difference in quantity of light is memorized as a data map and then the incident angle is directly read out from the memorized incident angle in accordance with the normalized difference in quantity of light. Furthermore, the construction of circuit, in which the difference in quantity of light is calculated on the basis of the quantity of light received on each light receiving portion, normalization is carried out, calculation is made on proportional equation and calibration or amendment is made, and the like, is omitted herewith.

Figure 19A:
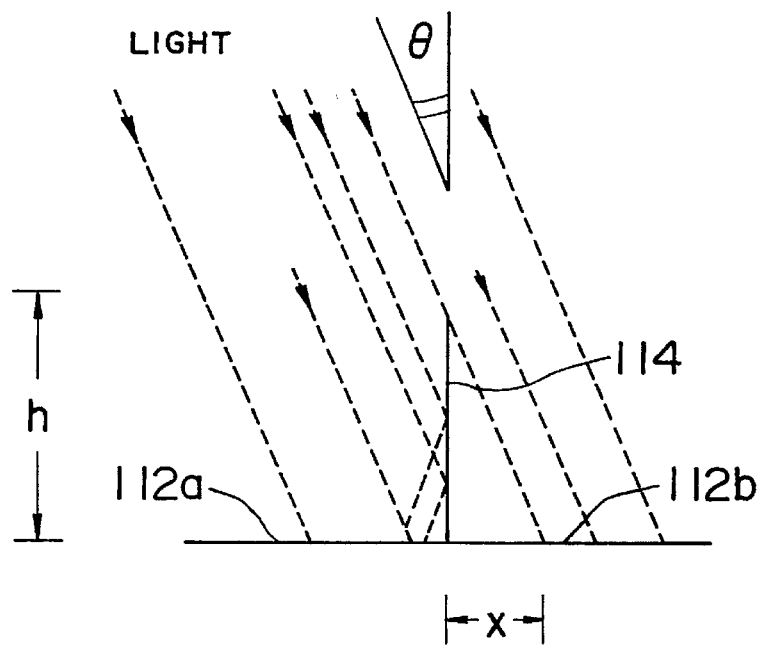
FIG. 19(a)–19(b) is a perspective view showing another embodiment of an angle detecting device in accordance with the present invention using two-division photodetector.
Figure 19B:
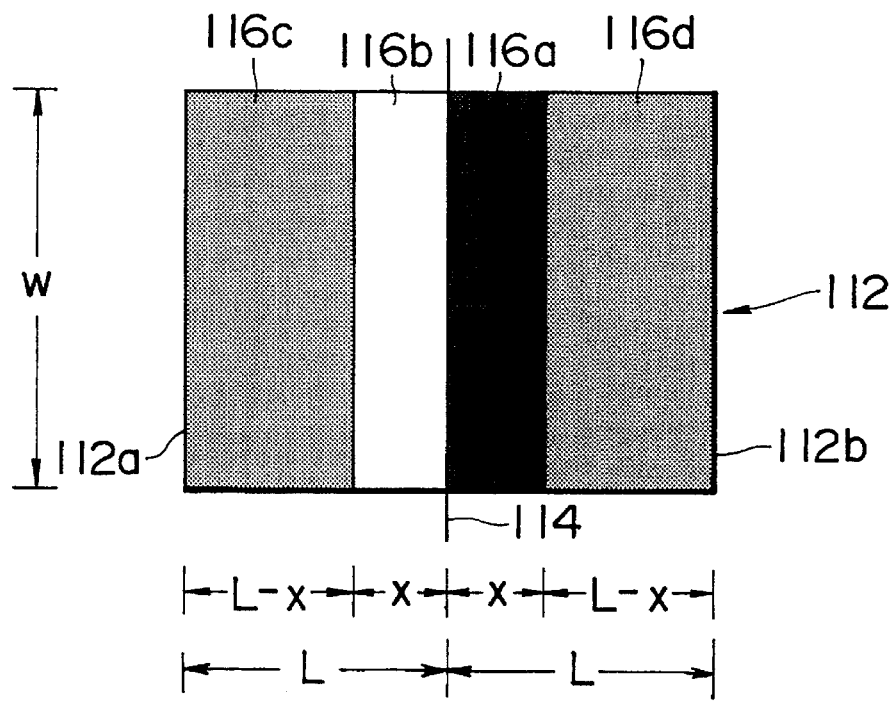

An explanation on a further different embodiment will be made with reference to FIG. 19. The angle detecting device in accordance with the embodiment is different from the previous embodiment in that a light intercepting plate 114 is made in the form of a two-surface mirror and its other structures are the same with the previous embodiment. Since the light intercepting plate 114 is made in the form of a two-surface mirror, the light which falls on the photodetector and impinges on the light intercepting plate 114 is reflected by the light intercepting plate and fails on the light receiving portion 112a. Consequently, the quantity of light (per unit area) received on the portion 116b which the reflected light also impinges on is two times the quantity of light received on the portions 116c and 116d which only a direct light fails on. In view of this, the procedure of angle calculation can be derived as described below. Although, in the embodiment, normalization is also made in a similar manner to that of the previous embodiment, as a method of normalization, this embodiment adopts the second method adopted in the previous embodiment, that is, the method of taking the ratio of the difference in quantity of light between two light receiving portions to the sum of quantities of light received on two light receiving portions. This is because, since the light reflected from the light intercepting plate fails on the light receiving portion, the sum of quantities of light corresponds to the quantity of light received on all area of light receiving portions independently of the incident angle and has a constant value.

Now, assumed that the length of each of light receiving portions 112a and 112b of the two-division photodetector is L, its width is W the height of the light intercepting plate is h, the difference between quantities of light received on the light receiving portions is D, and the angle of light falling on the light receiving portions with respect to the light intercepting plate 114 is θ, and in such a case the length of shadow or shading portion generated in the lengthwise direction of the light receiving portion due to the interception by the light intercepting plate 114 is x. Furthermore, assumed that the difference in quantity of light normalized by the ratio of the difference between quantities of light to the sum of quantities of light is $D_N$. The x is expressed in the following, similar to the previous embodiment:

$$x = h \cdot \tan \theta \tag{21}$$

Furthermore, $D_N$ is expressed in the following:

$$D_N = \{(x \cdot W + x \cdot W) - (x \cdot W - x \cdot W)\}/ \tag{22}$$
$$\{(L \cdot W + L \cdot W) + (L \cdot W - L \cdot W)\}$$
$$= 2 \cdot x \cdot W / 2 \cdot L \cdot W$$
$$= x/L$$

When the equation (21) is put in the equation (22), the following equation is obtained:

$$D_n = h \cdot \tan(\theta)/L$$

Consequently, $$\theta = \tan^{-1}(L \cdot D_N/h) \tag{23}$$

The relation between the normalized difference in quantity of light $D_N$ and the incident angle θ is also shown in FIG. 18, which is explained with reference to the previous embodiment. The equation (18) is obtained in the previous embodiment and the equation (23) obtained in this embodiment are the same, and thus they are the same line in FIG. 18.

Furthermore, by changing the shape of the light receiving portions of the photodetector, that is, the light receiving areas with respect to the incident angle, the above-mentioned direct proportional relation can be made to be more linear. Therefore, if a relatively exact proportional relation is produced, the angle can be calculated on the basis of a simple proportional equation without amendment.

Figure 20:
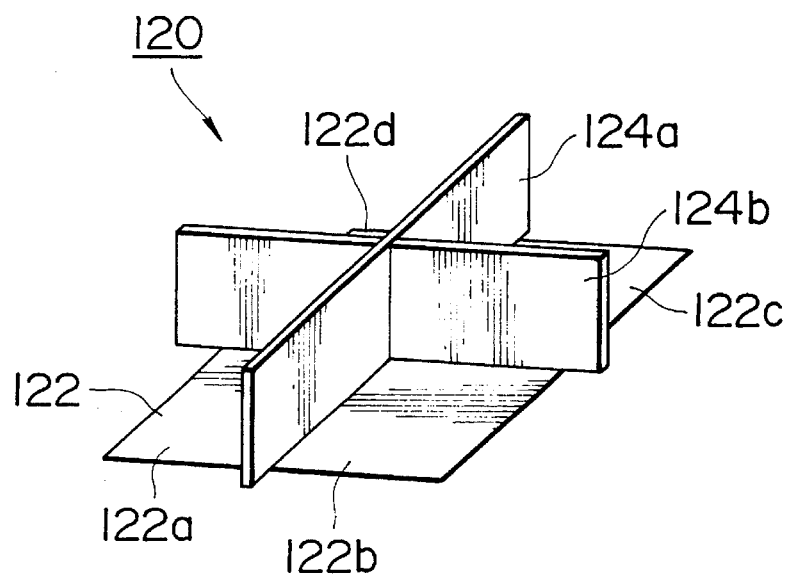
FIG. 20 is a perspective view showing a still another embodiment of an angle detecting device in accordance with the present invention using four-division photodetector.

Referring to FIG. 20, an explanation on a still another embodiment using a four-division photodetector for two-dimensional angle detection will be made. In FIG. 20, an angle detecting device 120 comprises a photodetector 122 having four light receiving portions 122a, 122b, 122c and 122d, and two light intercepting plates 124a and 124b disposed among the light receiving portions 122a, 122b, 122c and 122d. The two light intercepting plates 124a and 124b are perpendicular to each other and perpendicular with respect to the light receiving portions 122a, 122b, 122c and 122d. The two light intercepting plates 124a and 124b may be separate parts or may be integrally formed. Furthermore, they may be made of a light absorbing material or in the form of a two-surface mirror similar to those of the above-mentioned embodiments.

The principle of angle detection based on this angle detecting device 120 using four-division photodetector is similar to that of the above-mentioned embodiments. That is, each of two light intercepting plates has the same function as that of the abovementioned embodiments. Since two perpendicular light intercepting plates are used, two-dimensional angle detection can be made. Since, as mentioned above, the principle is the same, a further detailed explanation on this embodiment is omitted.

As mentioned above, with the angle detecting device in accordance with the present invention, all areas of light receiving portion are effectively used at maximum in order to detect an incident angle. For this, comparing with the conventional photodetector, the light receiving area required for the same dynamic range is approximately a half regarding the two-division photodetector, and approximately a one-fourth regarding the four-division photodetector. In other words, it is understood that, in order to obtain the same sensitivity, in case of the two-division photodetector, approximately a half size of photodetector can be used, and in case of the four-division photodetector, approximately a one-fourth size of photodetector can be used.

Although the previous description is concerned with only one light source, the angle detecting device in accordance with the present invention can be used in various ways. For example, by a combination of a two-division or a four-division photodetector and two light sources which are disposed at a suitable interval and alternately turned on, the two-dimensional position coordinate of the photodetector can be calculated. Furthermore, by using a four-division photodetector and three light sources which are disposed at a suitable interval and alternately turned on, the three-dimensional position coordinate of the photodetector can be calculated. Furthermore, by using a four-division photodetector and two light sources which are disposed at a suitable interval and alternately turned on, the angle of rotation or angle of swing of the photodetector can be calculated.

As mentioned above, since in the present invention, the angle detecting device is constructed so that the light receiving portions are used at maximum, the angle detecting device which is capable of making to be compact and uses a less expensive photodetector can be obtained.

What we claim:

1. A device for determining an incident angle of light, comprising;.

a photodetector having at least two adjacent light receiving portions, at least one light intercepting plate made of light absorbing material and disposed between said two light receiving portions, said plate being disposed vertically with regard to said light receiving portions, and means for calculating an incident angle θ of light from a light source incident on said photodetector based on the quantities of light received on each of said light receiving portions, in which the angle θ of light falling on the light receiving portions with regard to the light intercepting plate is expressed in the following equation:

$$\theta = \tan^{-1}(L \times D_{N1}/h)$$

wherein L is the length of each of the adjacent light receiving portions of said photodetector, h is the height of the light intercepting plate disposed between the two light receiving portions, and $D_{N1}$ is the difference in quantities of light normalized by taking a ratio of the difference between quantities of light received on the light receiving portions to the quantity of light received on the light receiving portions as a whole.

2. A device according to claim 1 in which said photodetector is a two-division photodetector having two light receiving portions and said light intercepting plate is one plate disposed between said two light receiving portions.

3. A device according to claim 1 in which said photodetector is a four-division photodetector having four light receiving portions, and said light intercepting plate are two plates each disposed between a pair of light receiving portions different from each other.

4. A device according to claim 1 in which an approximately proportional equation is set between the normalized difference between the quantities of light and the incident angle of light, and the incident light is calculated based on the equation thus set.

5. A device for determining an incident angle of light, comprising:

a photodetector having at least two adjacent light receiving portions, at least one light intercepting plate made of light absorbing material and disposed between said two light receiving portions, said plate being disposed vertically with regard to said light receiving portions, and means for calculating an incident angle θ of light from a light source incident on said photodetector based on the quantities of light received on each of said light receiving portions, in which the angle θ of light falling on the light receiving portions with regard to the light intercepting plate is expressed in the following equation:

$$\theta = \tan^{-1}(2L \times D_{N2}/(1+D_{N2})h)$$

wherein L is the length of each of the adjacent light receiving portions of said photodetector, h is the height of the light intercepting plate disposed between the two light receiving portions, and $D_{N2}$ is the difference in quantity of light normalized by taking a ratio of the difference between quantities of light received on the light receiving portions to the sum of quantities of light.

6. A device for determining an incident angle of light, comprising:

a photodetector having at least two adjacent light receiving portions, at least one light intercepting plate in the form of a two-surface mirror disposed between said two light receiving portions, said plate being disposed vertically with regard to said light receiving portions, and means for calculating an incident angle θ of light from a light source incident on said photodetector based on the quantities of light received on each of said light receiving portions, in which the angle θ of light falling on the light receiving portions with regard to the light intercepting plate is expressed in the following equation:

$$\theta = \tan^{-1}(L \times D_N/h)$$

wherein L is the length of each of the adjacent light receiving portions of said photodetector, h is the height of the light intercepting plate disposed between the two light receiving portions, and $D_N$ is the difference in quantities of light normalized by taking a ratio of the difference between quantities of light received on the light receiving portions to the quantity of light received on the light receiving portions as a whole.

7. A device according to claim 6 in which an approximately proportional equation is set between the normalized difference between the quantities of light and the incident angle of light, and the incident light is calculated based on the equation thus set.

* * * * *